United States Patent
Torio et al.

(10) Patent No.: US 11,337,378 B2
(45) Date of Patent: May 24, 2022

(54) PLANT CAGE

(71) Applicant: CRUSHPROOF TUBING COMPANY, McComb, OH (US)

(72) Inventors: R. Coady Torio, McComb, OH (US); Todd Grayson, McComb, OH (US)

(73) Assignee: CRUSHPROOF TUBING COMPANY, McComb, OH (US)

( * ) Notice: Subject to any disclaimer, the term of this patent is extended or adjusted under 35 U.S.C. 154(b) by 21 days.

(21) Appl. No.: 16/919,795

(22) Filed: Jul. 2, 2020

(65) Prior Publication Data
US 2021/0000023 A1      Jan. 7, 2021

Related U.S. Application Data

(60) Provisional application No. 62/869,695, filed on Jul. 2, 2019.

(51) Int. Cl.
*A01G 17/14* (2006.01)
*A01G 9/12* (2006.01)
*A01G 13/02* (2006.01)

(52) U.S. Cl.
CPC .......... *A01G 9/128* (2013.01); *A01G 13/0212* (2013.01)

(58) Field of Classification Search
CPC .......... A01G 9/12; A01G 9/122; A01G 9/124; A01G 9/128; A01G 13/0212; A01G 17/04; A01G 17/06; A01G 17/14; F16L 3/00; F16L 3/02; F16L 3/08; F16L 3/10; F16L 1/06

USPC ........................................ 47/44–47
See application file for complete search history.

(56) References Cited

U.S. PATENT DOCUMENTS

| 4,667,438 A | 5/1987 | Corell | |
| 5,640,802 A * | 6/1997 | Elliott | A01G 9/12 248/156 |
| 7,874,100 B2 * | 1/2011 | Miller | A01G 9/12 47/46 |
| 8,006,433 B1 * | 8/2011 | Bryanton | A01G 9/12 47/45 |
| 8,935,879 B1 * | 1/2015 | Falk | A01G 9/124 47/45 |
| 2015/0223412 A1 | 8/2015 | Vanderwall-Arnold et al. | |

FOREIGN PATENT DOCUMENTS

KR   20100114635 A  * 10/2010 ............. A01G 17/14

* cited by examiner

*Primary Examiner* — Peter M Poon
*Assistant Examiner* — Danielle A Clerkley
(74) *Attorney, Agent, or Firm* — Michael E. Dockins; Shumaker, Loop & Kendrick, LLP (57) ABSTRACT

A plant cage includes an annular base configured to surround a portion of a plant. The base includes a plurality of circumferentially spaced stake openings formed therethrough. Each of the stake openings is inclined relative to a central axis of the base. The base is formed from a first segment releasably coupled to a second segment. The plant cage further includes a plurality of stakes. Each of the stakes is configured to extend through one of the stake openings formed in the base. A first portion of each of the stakes is received in the ground and a second portion of each of the stakes extends away from the ground into a substantially conical shape.

12 Claims, 6 Drawing Sheets

PLANT CAGE

CROSS-REFERENCE TO RELATED APPLICATION

This patent application claims priority to U.S. Provisional Patent Application Ser. No. 62/869,695, filed on Jul. 2, 2020, the entire disclosure of which is hereby incorporated herein by reference.

FIELD OF THE INVENTION

The present invention relates generally to garden tools, and more particularly, to a device for increasing yield from fruit and vegetable bearing plants.

BACKGROUND OF THE INVENTION

There are millions of tomatoes planted every year in private gardens across the globe. The tomato plant is naturally a vine that sprawls out on the ground, so a large majority of growers use a wire cage or frame of some form to keep the tomato plants upright.

Unfortunately, the existing cages and frames have many flaws. Such cages are typically weak adjacent the ground level and are therefore easy to tip over in a manner potentially damaging the plant surrounded by the cage. It is also common for such cages to be relatively narrow in a manner preventing the corresponding plant from growing outwardly while maintaining suitable support of the plant and any fruit produced by the plant. There also exists a shortcoming of many existing cages wherein the cage cannot be repositioned to fit growth in any specific direction. As a result, it may be necessary to undesirably bend longer branches back into the cage for ample support. Lastly, the constrictive sizes and configurations of existing cages tend to encourage dense growth of the plant that can in many instances promote the growth of mold and/or disease on the plant that can then easily spread.

It is especially common for more simplistic cages comprised of fewer components to be flimsy and therefore undesirably lacking in support. However, in contrast, more robust cages are typically much more complex and difficult to assemble, as well as being significantly more expensive than the simpler designs.

It is accordingly desirable to provide an improved plant cage that is easy to install, cost effective, structurally robust, easy to store when not in use, able to be adjusted to a variety of different sizes and configurations, and able to be adapted to a variety of different desired applications.

SUMMARY OF THE INVENTION

Concordant and congruous with the present invention, an improved plant cage has surprisingly been discovered.

According to an embodiment of the present invention, a plant cage includes a base configured to surround a portion of a plant and a plurality of stakes. The base includes a plurality of circumferentially spaced stake openings formed therethrough. Each of the stakes is configured to extend through one of the stake openings formed through the base.

According to another embodiment of the present invention, a plant cage includes an annular base configured to surround a portion of a plant. The base includes a plurality of circumferentially spaced stake openings formed therethrough. Each of the stake openings is inclined relative to a central axis of the base. The base is formed from a first segment releasably coupled to a second segment. The plant cage further includes a plurality of stakes. Each of the stakes is configured to extend through one of the stake openings formed through the base. A first portion of each of the stakes is received in the ground and a second portion of each of the stakes extends away from the ground.

A kit for forming a plant cage is also disclosed. The kit includes a first segment of a base and a second segment of the base. The first segment includes a plurality of stake openings formed therethrough and the second segment includes a plurality of the stake openings formed therethrough. The kit further includes a plurality of stakes. Each of the stakes is configured to extend through one of the stake openings of the first segment or the second segment. The kit may also include a length of wire and/or a protective cover for placement over the plant cage.

BRIEF DESCRIPTION OF THE DRAWINGS

The above, as well as other advantages of the present invention, will become readily apparent to those skilled in the art from the following detailed description of a preferred embodiment when considered in the light of the accompanying drawings.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-7 illustrate a plant cage 10 according to an embodiment of the present invention. The plant cage 10 generally includes a base 12 and a plurality of stakes 50. The plant cage 10 is configured for installation into the ground 5, wherein the ground 5 is representative of soil or the like as would be present in a garden or other plant growing environment. However, the ground 5 may be representative of any material having a depth and softness for penetration by the stakes 50 and support of the base 12, as desired. The stakes 50 are configured to be received through the base 20 and into the ground 5 to establish a structural configuration and position of the plant cage 10 relative to the ground 5.

The plant cage 10 forms a structure for a plant to grow within or onto during development of the plant. The plant cage 10 may be particularly well suited for the growth of a vine-like plant such as, but not limited to, a tomato plant. However, it should be apparent to one skilled in the art that the plant cage 10 may be configured for a variety of different applications for surrounding a plant or forming a structure onto which a plant is grown while remaining within the scope of the present invention. For example, the form and configuration of the plant cage 10 may be adapted to protect certain plants from damage or interference in some circumstances as opposed to structurally supporting or defining the growth of the plant used in conjunction with the plant cage 10.

Figure 1:
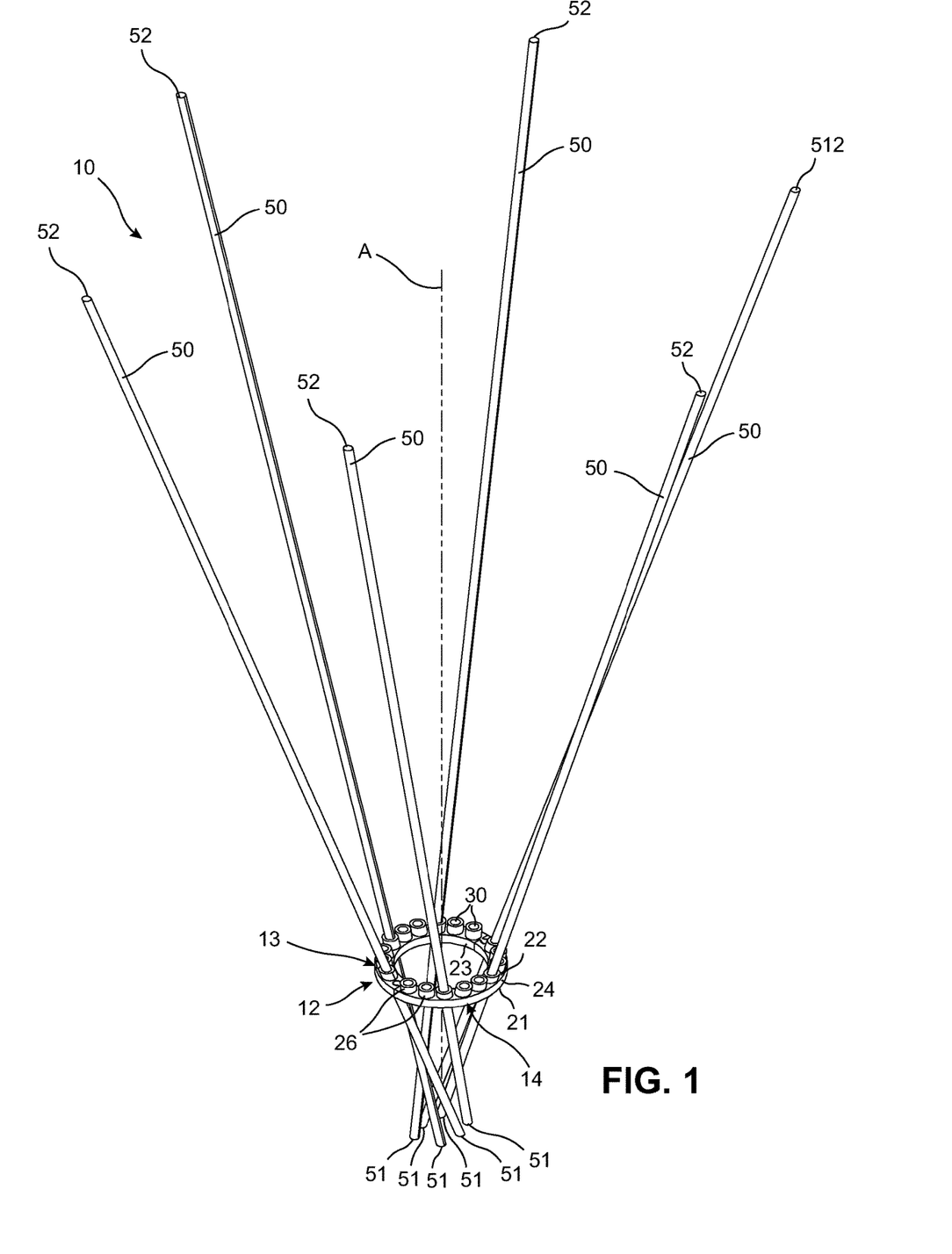
FIG. 1 is a front perspective view of a plant cage including a base and a plurality of stakes according to an embodiment of the present invention.
Figure 2:
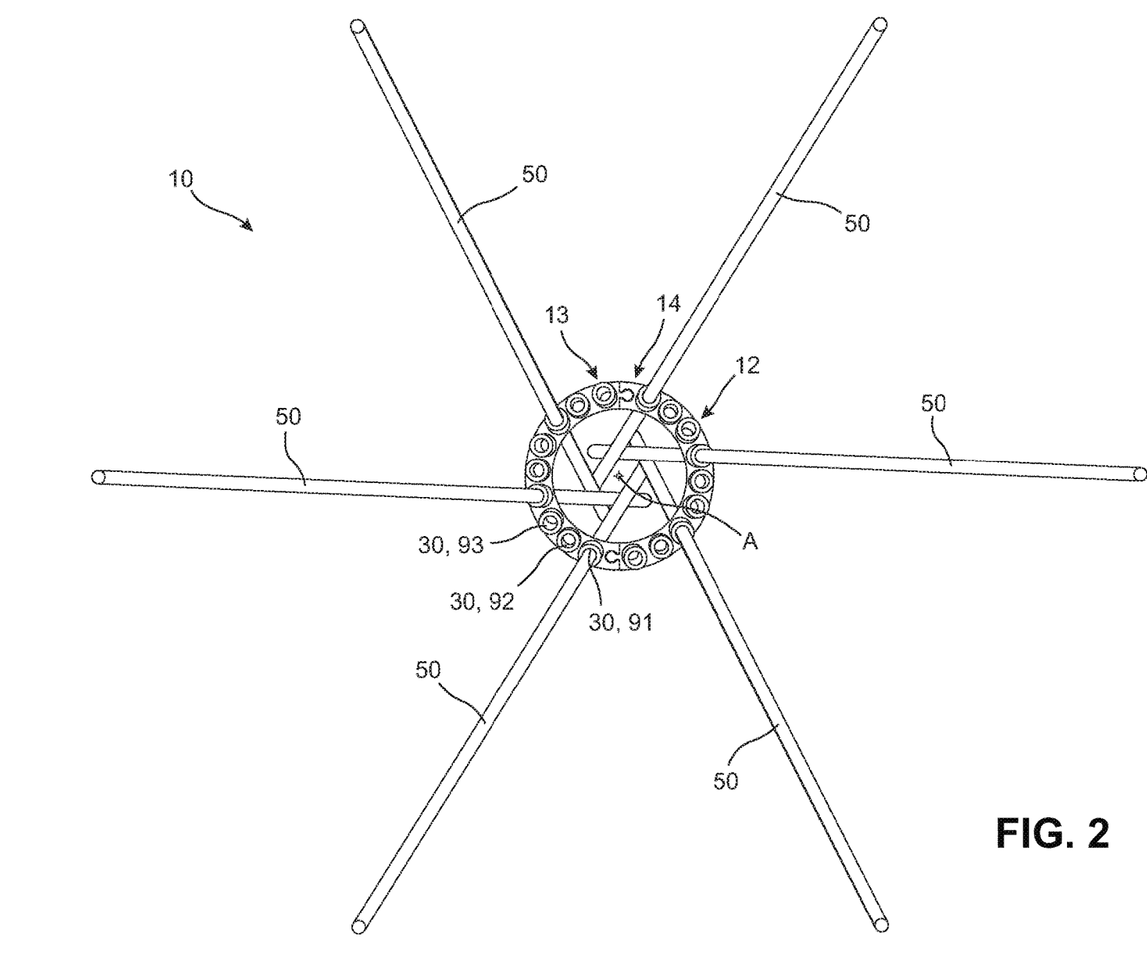
FIG. 2 is a top plan view of the plant cage of FIG. 1.
Figure 5:
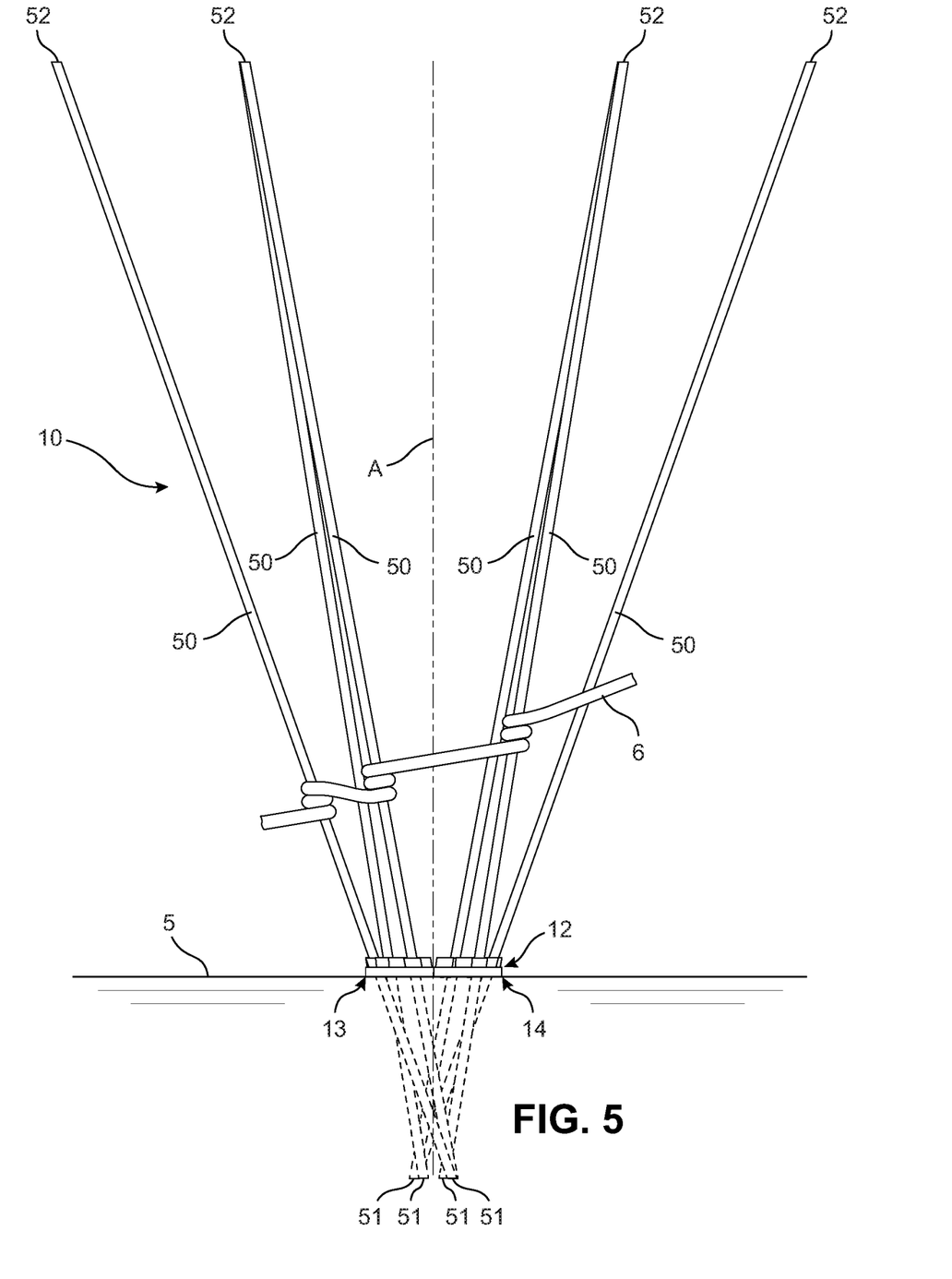
FIG. 5 is a front elevational view of the plant cage of FIG. 1 when installed into the ground, wherein the portions of the stakes received into the ground are shown in broken line form.

The stakes 50 are elongate rods or shafts extending longitudinally from a first end 51 to an opposing second end 52. As used hereinafter, the first end 51 of each of the stakes 50 refers to the end of each of the stakes 50 configured for insertion into the ground 5 while the second end 52 of each of the stakes 50 refers to the end of each of the stakes 50 disposed distally from the ground 5 when each of the stakes 50 is in the installed and upright position. The stakes 50 are illustrated as being cylindrical in shape, but alternative cross-sectional shapes may be utilized such as a square cross-sectional shape. The stakes 50 may be pointed at one or both of the ends 51, 52 to either promote the insertion of the stakes 50 into the ground 5 or to provide a piloting feature for guiding the stakes 50 into the base 12, as described in greater detail hereinafter. The stakes 50 may be formed from any substantially rigid material capable of withstanding the insertion of the stakes 50 into the ground 5 and the weight of any plant or other materials supported by the stakes 50. For example, the stakes 50 may be formed to include a steel core with a plastic coating placed thereon. Alternatively, the stakes 50 may be exclusively formed from a metallic material or a rigid plastic, as desired. The stakes 50 may have any suitable dimensions for the given application, including being about 6 feet long and about ½ inch in diameter, as one non-limiting example.

The base 12 is configured to surround a stem or lowermost portion of the corresponding plant at a position on or immediately adjacent the surface of the ground 5 into which the stakes 50 are driven. The base 12 is substantially annular or ring-like in configuration as it extends around the lower portion of the plant. The base 12 may alternatively be referred to as the base plate or the base collar, as desired. The base 12 may be formed from any substantially rigid material having the robustness for establishing and maintaining the shape and configuration of the plant cage 10. The base 12 may preferably be formed from a moldable material such as a metallic material or a polymeric material such as a rigid plastic, as desired. The base 12 may have any suitable dimensions for the given application, including an outer diameter in the range of 6 inches to 1 foot, as a non-limiting example.

Figure 3:
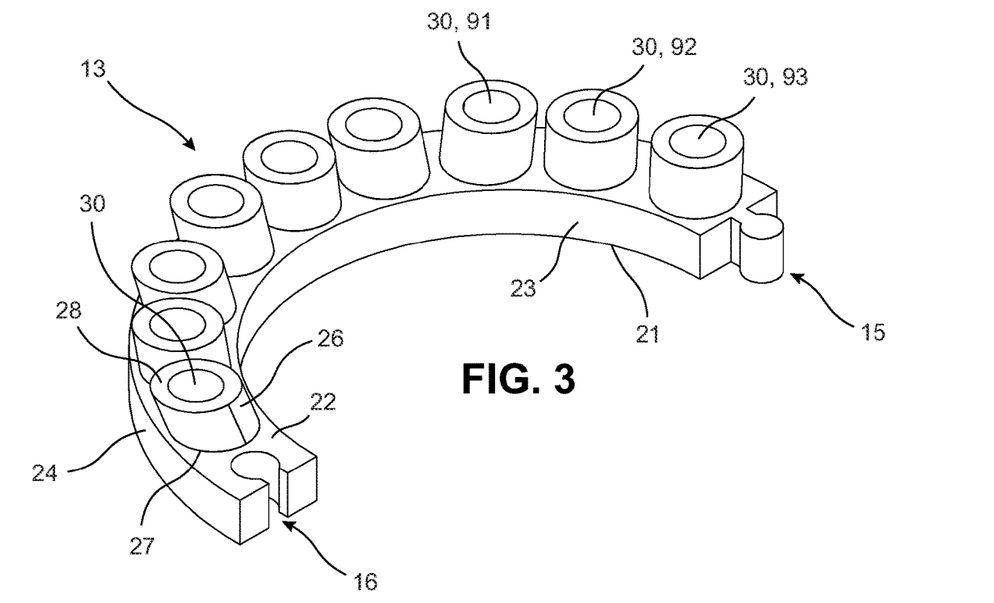
FIG. 3 is a perspective view of a first segment of the base of the plant cage.
Figure 4:
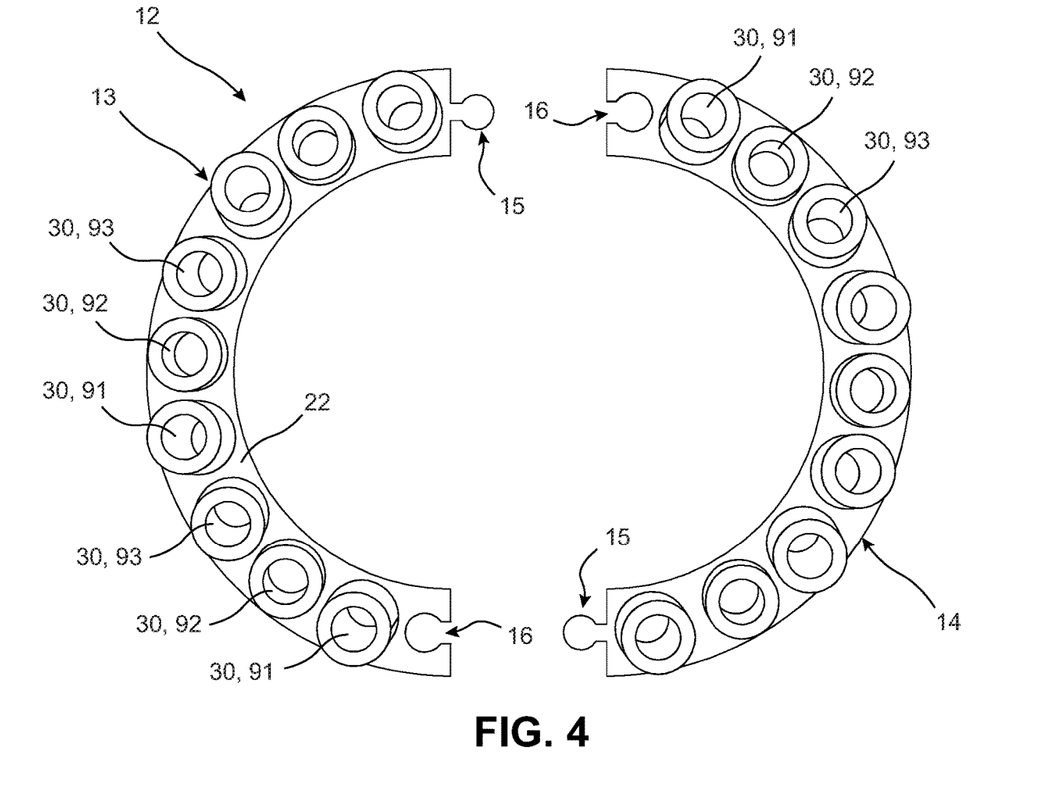
FIG. 4 is a top plan view of first and second segments releasably coupled to each other to form the base of the plant cage.

The base 12 may be provided by the cooperation of a first segment 13 and a second segment 14 that are coupled to each other to surround the corresponding portion of the plant. FIG. 3 illustrates one of the segments 13, 14 in isolation while FIG. 4 shows the pair of the cooperating segments 13, 14 immediately prior to the coupling thereof. The first and second segments 13, 14 are beneficially provided to include identical shapes and configurations such that each of the segments 13, 14 occupy half of the resultant base 12, wherein the use of identical structures for each of the segments 13, 14 beneficially simplifies the manufacturing process for forming the base 12 by allowing for the same process and apparatus to be utilized in forming each of the cooperating segments 13, 14. For example, if a molding or casting process is used in forming the base 12, the same mold may be utilized in forming each of the segments 13, 14.

Each of the segments 13, 14 is accordingly provided as a semi-circular or semi-annular component occupying half of the resultant structure of the base 12, wherein the second segment 14 may be rotated 180 degrees relative to the first segment 13 prior to the coupling of the first and second segments 13, 14. Each of the segments 13, 14 includes a first coupling feature 15 formed at a first end of the corresponding segment 13, 14 and a second coupling feature 16 formed at the opposing second end of the corresponding segment 13, 14 and configured for releasable coupling to the first coupling feature 15. In the provided embodiment, the first coupling feature 15 resembles a key having a circular portion connected to the remainder of the corresponding segment 13, 14 by an adjacent rectangular portion while the second coupling feature 16 resembles a key hole having a shape complimentary to the first coupling feature 15. Specifically, the key hole similarly includes a circular opening and an adjacent rectangular opening indented into the second end of the corresponding segment 13, 14. The first coupling feature 15 may be referred to as a male component while the second coupling feature 16 may be referred to as a female component.

The complimentary shapes present between the first coupling feature 15 and the second coupling feature 16 allow for the segments 13, 14 to be coupled to each other by either sliding the complimentary shapes relative to each other with respect to an axial direction of the resultant base 12, or by pressing the segments 13, 14 towards each other with the opposing coupling features 15, 16 facing towards each other, wherein the pressing of the segments 13, 14 into each other is performed in a direction perpendicular to the axial direction of the base 12 while the complimentary shapes form a snap-fit connection with each other. The snap-fit connection may be established by an expansion of the opening formed by one of the second coupling features 16 during reception of the opposing and complimentary one of the first coupling features 15 therein followed by a subsequent resilient contraction of the second coupling feature 16 to the original shape thereof following insertion of the first coupling feature 15.

It should be apparent that the disclosed key/male and keyhole/female shapes may be replaced with substantially any complimentary shapes allowing for the sliding connection or the snap-fit connection as described herein, as desired, without necessarily departing from the scope of the present invention. It should also be apparent that other complimentary coupling methods utilizing the same structure for each of the segments 13, 14 may also be employed while remaining within the scope of the present invention, such as the inclusion of openings or the like at each of the ends of the segments 13, 14 that are then configured to receive a fastener or the like at the junction of each of the ends of the segments 13, 14. Any structural configuration allowing for the segments 13, 14 to be releasably joined in a manner surrounding the desired portion of the plant may be utilized while still appreciating the other beneficial features of the present invention.

The segments 13, 14 may also be provided to include different structures from each other or substantially symmetric structures while still being configured for coupling in a manner surrounding the desired portion of the plant. For example, the segments 13, 14 may be provided with one end of each of the segments 13, 14 configured to form a hinged or pivotal connection to allow for the segments 13, 14 to be pivoted towards each other and around the desired portion of the plant. Such a hinged connection may further include a male component formed at an end of one of the segments 13, 14 opposite the hinged connection and a corresponding female component formed at an end of the other of the segments 13, 14 opposite the hinged connection. As yet another example, one of the segments 13, 14 may include male components at each of the ends thereof while the other of the segments 13, 14 includes corresponding female components at each of the ends thereof. One skilled in the art should appreciate that any combination of the described configurations may be utilized while maintaining the beneficial configuration of the stakes 50 relative to the base 12 as explained in greater detail hereinafter.

The assembled base 12 includes a first axial end surface 21 configured to face towards and rest on the exposed surface of the ground 5 and a second axial end surface 22 formed opposite the first axial end surface 21 and configured to face upwardly away from the surface of the ground 5. The base 12 further includes an inner circumferential surface 23 and an outer circumferential surface 24 connecting the first and second axial end surfaces 21, 22. In the present embodiment, the first and second axial end surfaces 21, 22 are parallel to each other and are spaced from each other with respect to a height direction of the base 12. Additionally, the inner and outer circumferential surfaces 23, 24 are each arranged parallel to the height direction of the base 12 to cause the base 12 to have a substantially rectangular cross-sectional shape extended annularly around a circumferential direction of the base 12. A central axis A of the plant cage 10 is formed at a center of the base 12 and defines a radius of curvature of each of the circumferential surfaces 23, 24. The central axis A extends parallel to the height direction of the base 12 to cause the central axis A to be arranged substantially perpendicular to the surface of the ground 5 when the plant cage 10 is properly installed relative to the ground 5, wherein the central axis A defines a longitudinal direction of the assembled plant cage 10.

In the present embodiment, the base 12 includes a plurality of guide projections 26 projecting outwardly from the second axial end surface 22 thereof. Each of the guide projections 26 includes a proximate end 27 intersecting the second axial end surface 22 and a distal end 28 spaced apart from the second axial end surface 22. The base 12 further includes a plurality of stake openings 30 formed therethrough with each of the stake openings 30 extending rectilinearly through the base 12 from the first axial end surface 21 thereof to the distal end 28 of a corresponding one of the guide projections 26. Each of the stake openings 30 is provided to receive one of the stakes 50 therethrough during installation of the plant cage 10 into the ground 5. The stake openings 30, and hence the corresponding guide projections 26, are spaced circumferentially about the annular shape of the base 12. The stake openings 30 may be equally spaced from each other or may be spaced from each other at irregular intervals. In the provided example, the stake openings 30 are spaced equally from each other with respect to each of the segments 13, 14 forming the base 12 while the stake openings 30 separated from each other at the junction of the segments 13, 14 are spaced at a slightly greater distance from each other to accommodate the inclusion of the cooperating coupling features 15, 16.

The stake openings 30 include a cross-sectional shape and size substantially corresponding to a cross-sectional shape and size of each of the stakes 50. In the illustrated embodiment, each of the stake openings 30 includes a circular cross-sectional shape with respect to a cross-section arranged perpendicular to a direction of rectilinear extension of the corresponding stake opening 30 in order to accommodate the cylindrically shaped stakes 50. A diameter of each of the stake openings 30 may be selected to be substantially equal to or slightly larger than an outer diameter of each of the stakes 50 to ensure entry of the stakes 50 therein. As mentioned above, the stakes 50 may be provided to include about a ½ in outer diameter, so each of the stake openings 30 may similarly include a corresponding ½ in diameter or potentially a slightly greater diameter, such as 9⁄16 in or 5⁄8 in. A tightness of the fit present between each of the stake openings 30 and each of the corresponding stakes 50 may be selected to ensure that a desired, and relatively small, degree of play is present between the stakes 50 and the base 12 while still establishing a desired arrangement of each of the stakes 50 relative to the base 12 when received therein. It should be apparent that other cross-sectional shapes, such as a square cross-sectional shape, may be provided for the stakes 50 and the corresponding stake openings 30 without altering the manner of use of the plant cage 10, as desired.

The guide projections 26 aid in elongating each of the stake openings 30 to an extent for properly establishing a configuration of the stakes 50 when received within the stake openings 30 while also reducing the amount of material utilized in forming the base 12. For example, the base 12 could alternatively be formed in the absence of the guide projections 26 while maintaining the same length of each of the stake openings 30, but such an alternative configuration would necessitate the extension of the height of the base 12 between the first and second axial end surfaces 21, 22 thereof, which would result in an increase in the volume of the resultant base 12 and hence the material utilized in manufacturing the base 12. The guide projections 26 may be substantially cylindrical in configuration to accommodate the cylindrical shape of each of the stake openings 30, as desired.

Each of the stake openings 30 is formed through the base 12 in a direction that is inclined at an acute angle relative to the central axis A of the base 12. The incline of each of the stake openings 30 is provided to be at least partially in the radial direction of the base 12 as measured from the central axis A, wherein the portion of each of the stake openings 30 intersecting the first axial end surface 21 of the base 12 is positioned closer to the central axis A than is the portion of each of the stake openings 30 intersecting the distal end 28 of each of the guide projections 26. This radial incline causes the portion of each of the stakes 50 extending away from the ground 5 and towards the second end 52 of the corresponding stake 50 to project at least partially radially outwardly away from the central axis A while also causing the portion of each of the stakes 50 extending downwardly into the ground 5 and towards the first end 51 of the corresponding stake 50 to project at least partially radially inwardly towards the central axis A.

Referring now primarily to FIGS. 2 and 4, which best show the configuration of each of the stake openings 30 from a top perspective of the base 12, the stake openings 30 may be provided to include variable angles of inclination relative to each of the central axis A of the base 12 and a tangential direction of the base 12 at a position of each of the stake openings 30 around the circumference of the base 12, wherein each of the tangential directions is arranged perpendicular to the central axis A. Specifically, it can be seen in FIG. 4 that the stake openings 30 are provided in three different sets 91, 92, 93, wherein the stake openings 30 belonging to each of the different sets 91, 92, 93 are repeated around the circumference of the base 12 in the same order. For example, with reference to the first segment 13 of FIG. 4, one of the stake openings 30 belonging to the first set 91 is disposed immediately adjacent the second coupling feature 16 (bottom of the first segment 14 from the perspective of FIG. 4), one of the stake openings 30 belonging to the second set 92 is disposed immediately adjacent and clockwise (from the perspective of FIG. 4) relative to the identified one of the stake openings 30 belonging to the first set 91, and one of the stake openings 30 belonging to the third set 93 is disposed immediately adjacent and clockwise relative to the identified one of the stake openings 30 belonging to the second set 92. This pattern repeats with respect to the clockwise direction of the first segment 13 and continues across the junction to the second segment 14. The base 12 accordingly includes six of the stake openings 30 belonging to each of the first set 91, the second set 92, and the third set 93.

The stake openings 30 of the first set 91 include a first angle of inclination relative to the central axis A, the stake openings 30 of the second set 92 include a second angle of inclination relative to the central axis A, and the stake openings 30 of the third set 93 include a third angle of inclination relative to the central axis A. The first angle is greater than the third angle, and the third angle is in turn greater than the second angle. As one example, the first angle may be in the range of 15-20 degrees, the third angle may be in the range of 10-15 degrees, and the second angle may be in the range of 5-10 degrees. However, any different angles may be utilized for the first, second, and third angles, as desired.

The stake openings 30 of the first set 91 and the third set 93 are also inclined to extend at least partially in the tangential direction of the base 12, whereas the stake openings 30 of the second set 92 extend substantially in the radial direction of the base 12 directly towards or away from the central axis A. As can be seen from the perspective of FIGS. 2 and 4, the tangential inclination of the stake openings 30 of the first set 91 cause each of the stakes 50 to extend slightly towards the clockwise direction when extending upwardly from the base 12 while the stake openings 30 of the third set 93 are arranged oppositely to the first set 91 and cause the corresponding stakes 50 to extend slightly towards the counterclockwise direction when extending upwardly from the base 12.

The inclusion of the three different sets 91, 92, 93 of the stake openings 30 beneficially allows for the base 12 to include a variety of different configurations of the stakes 30 depending on which of the sets 91, 92, 93 is selected to receive the six of the stakes 50 shown in FIGS. 1 and 2. The different angles of inclination relative to the central axis A among the different sets 91, 92, 93 results in the spread of the stakes 50 at a position distal from the ground 5 to vary depending on the set 91, 92, 93 of the stake openings 30 selected for receiving the stakes 50. This radial outward spread of the stakes 50 as they project away from the base 12 and towards the first ends 51 thereof results in the stakes 50 collectively forming a substantially conical configuration above the base 12. Based on the length of the stakes 50 and the selected angle of inclination of the desired set 91, 92, 93 of the stake openings 30, a preselected spread of the distal ends of the stakes 50 across diametrically opposed portions of the array of the stakes 50 can be selected.

For example, the stakes 50 may be provided to each include a length, such as the previously mentioned 6 feet, wherein about 10-12 inches of each of the stakes 50 is received into the ground 5 and the remainder of each of the stakes 50 projects out of the ground 5 upwardly. The exposed portions of each of the stakes 50 may be spread apart a maximum of about 20 inches with respect to the selection of the second set 92 (using the smallest inclination corresponding to the second angle), about 30 inches with respect to the third set 93 (using the intermediate inclination corresponding to the third angle), and about 40 inches with respect to the first set 91 (using the largest inclination corresponding to the first angle). It should be understood that other dimensions for the stakes 50 and other suitable angles of inclination of the stake openings 30 may also be utilized to form alternative spreads, as desired, while still appreciating the beneficial features of the present invention. Additionally, the base 12 may be produced to include any number of the stake openings 30 having any different number of sets of similar orientations for receiving any number of the stakes 50 without departing from the scope of the present invention. For example, the base 12 may include four sets of different orientations of the stake openings 30 repeated about the circumference thereof and may include any number of repetitions of the same stake opening configurations around the circumference for receiving any number of the stakes 50.

Additionally, any combination of the stake openings 30 may be selected for reception of the desired number of the stakes 50, including utilizing some of the stake openings 30 from two or all three of the sets 91, 92, 93 in order to prescribe a desired shape of the array of the stakes 50 when installed into the base 12. The use of some of the stake openings 30 from the different sets 91, 92, 93 may facilitate a variable spacing between adjacent ones of the stakes 50 when installed into the base 12. For example, as a plant such as a tomato plant grows relative to the plant cage 10, it may be desirable to alter the orientation and/or position of one or more of the stakes 50 to accommodate the growth pattern of the tomato plant, hence the stakes 50 may be repositioned, added, or removed from the base 12 to fit the given circumstances.

The variability of the angles of inclination between the different stake openings 30 and hence the different installed stakes 50 prevent interference between the portions of the stakes 50 received into the ground 5 so that multiple different configurations can be used among the different sets 91, 92, 93 in addition to providing the variability of the spread of the installed stakes 50 as discussed above.

The manner in which the stakes 50 penetrate the ground 5 at any of the disclosed non-perpendicular and in many instances opposing directions provides advantages in stabilizing the plant cage 10 when in the installed position. Because the different stakes 50 are not all arranged perpendicular to the surface of the ground 5, it is much more difficult for the entirety of the plant cage 10 to undesirably pull out of the ground 5 in the vertical direction, such as when encountered by harsh weather, incidental contact, or interference from animals or the like. Additionally, the variable angles of inclination also prevent tipping of the plant cage 10 in any one direction as at least some of the stakes 50 are always arranged to directly oppose such rotational motion due to the opposing orientations between opposing sides of the base 12. Also, the rigidity present at the base 12 when all of the stakes 50 are received therein prevents substantial movement of any of the stakes 50 individually, which also increases the stability and resilience against tipping or removal of the plant cage 10.

It should also be apparent that the previously described rectangular cross-sectional shape of the base 20 may also be replaced with substantially any alternative cross-sectional shape so long as the stake openings 30 extend through the base 20 at desired lengths and at desired orientations. For example, the base 12 may include a circular cross-sectional shape extended circumferentially in the shape of a torus, wherein each of the stake openings 30 penetrates through diametrically opposing portions of the circular cross-section at the desired orientation. The axial end surfaces 21, 22 and circumferential surfaces 23, 24 may also be shaped and inclined differently from that disclosed so long as the stake openings 30 still prescribe the desired pattern of the stakes 50 when received therethrough. Additionally, it should also be understood that alternative shapes of the base 12 suitable for surrounding the lower part of the corresponding plant, such as square or hexagonal shapes, may also be used in place of the illustrated circular shape, as desired.

Referring now to FIG. 5, a method of use of the plant cage 10 is shown. As mentioned throughout hereinabove, the base 12 is first assembled around the stem or lowermost exposed portion of the corresponding plant (not shown) with the cooperating coupling features 15, 16 of the segments 13, 14 engaged to each other to complete the annular configuration of the base 12. Next, each of the stakes 50 is extended through the desired ones of the stake openings 30, such as inserting each of the stakes 50 through each of the stake openings 30 belonging to one of the illustrated sets 91, 92, 93. However, alternative patterns and numbers of stakes 50 may be utilized in addition to those shown herein. The stakes 50 may be inserted into the ground 5 approximately 10-12 inches deep, or any desired depth for establishing the structural stability of the plant cage 10.

Next, a length of wire 6 may be routed through or around the stakes 50 in a desired configuration, such as wrapping the wire 6 circumferentially around the conical shape formed by the array of the stakes 50 while progressing upwardly away from the base 12. However, any desired shape and configuration of the wire 6 may be utilized in accordance with the given application or desired characteristics of the plant being caged. The wire 6 may be soft garden wire or the like, so long as the wire 6 is formable into a desired shape while remaining rigid enough when at rest to support the portions of the plant engaging the wire 6. The wire 6 is preferably selected to include a width and a softness that prevents damage to the plant when growing around or into the wire 6. The wire 6 may, for example, include a metallic core that is covered with an elastomeric or other polymeric cover, as desired. Any length of the wire 6 may be utilized or multiple segments of the wire 6 may be utilized, as desired. The wire 6 may, for example, be wrapped once or twice around each of the selected stakes 50 with the friction and rigidity of the wire 6 maintaining the desired configuration of the wire 6 relative to the array of the stakes 50.

During growth of the plant the stakes 50 may be removed, added, replaced, or repositioned by individually inserting or removing the stakes 50 relative to the stake openings 30. As mentioned above, the insertion of multiple of the stakes 50 within the base 12 simultaneously prevents undesired removal or tipping of the plant cage 10 during use thereof. The plant cage 10 may be further reconfigured by removing, adding, replacing, or repositioning the wire 6 into any desired configuration due to the flexibility and formability thereof. The plant cage 10 is accordingly able to be arranged into a large variety of different configurations easily and without the need for specialized tools or the like.

The plant cage 10 provides numerous advantageous features as mentioned hereinabove. The base 12 provides a sturdy and robust structure that can accommodate the often top-heavy weight distribution of plants suitable for use with the plant cage 10, such as a fruit bearing tomato plant. The conical and progressively widening shape of the array of the stakes 50 also allows for sprawling growth of the corresponding plant when progressing away from the ground 5. The modular configuration of the plant cage 10 also aids in storing the disassembled components forming the plant cage 10, as each of the components include a relatively small profile in at least one dimension thereof. The use of the relatively soft and formable gardening wire 6 is also easier on the plant than is the thinner wire traditionally used for such cages. The plant cage 10 can be installed in only minutes and without the need for specialized tools or the like. The adjustability of the plant cage 10 also allows for the plant cage 10 to be adapted for a variety of different plants, garden configurations, and garden sizes. The plant cage 10 is also easy to manufacture due to the base 12 being formed from two identically formed segments 13, 14, as well as the existing commercial availability of elements such as the stakes 50 and the wire 6 optionally used to supplement the structure of the plant cage 10. Lastly, the plant cage 10 can be provided without the need for complicated or excessive instructions due to the manner in which the base 12 prescribes various configurations of the stakes 50 and the ability to customize the configuration of the optionally utilized wire 6 for supplementing the structure of the plant cage 10.

The configuration of the plant cage 10 also allows for the plant cage 10 to be inverted with the base 12 disposed adjacent the uppermost surface of the resulting structure with the maximally spread ends of the stakes 50 received into the ground 5. Such an inverted configuration of the plant cage 10 may be utilized as a bean tower or fruiting vine tower while still maintaining the robustness of the plant cage 10 due to the inclined and opposing entry of the stakes 50 into the ground 5.

Figure 6:
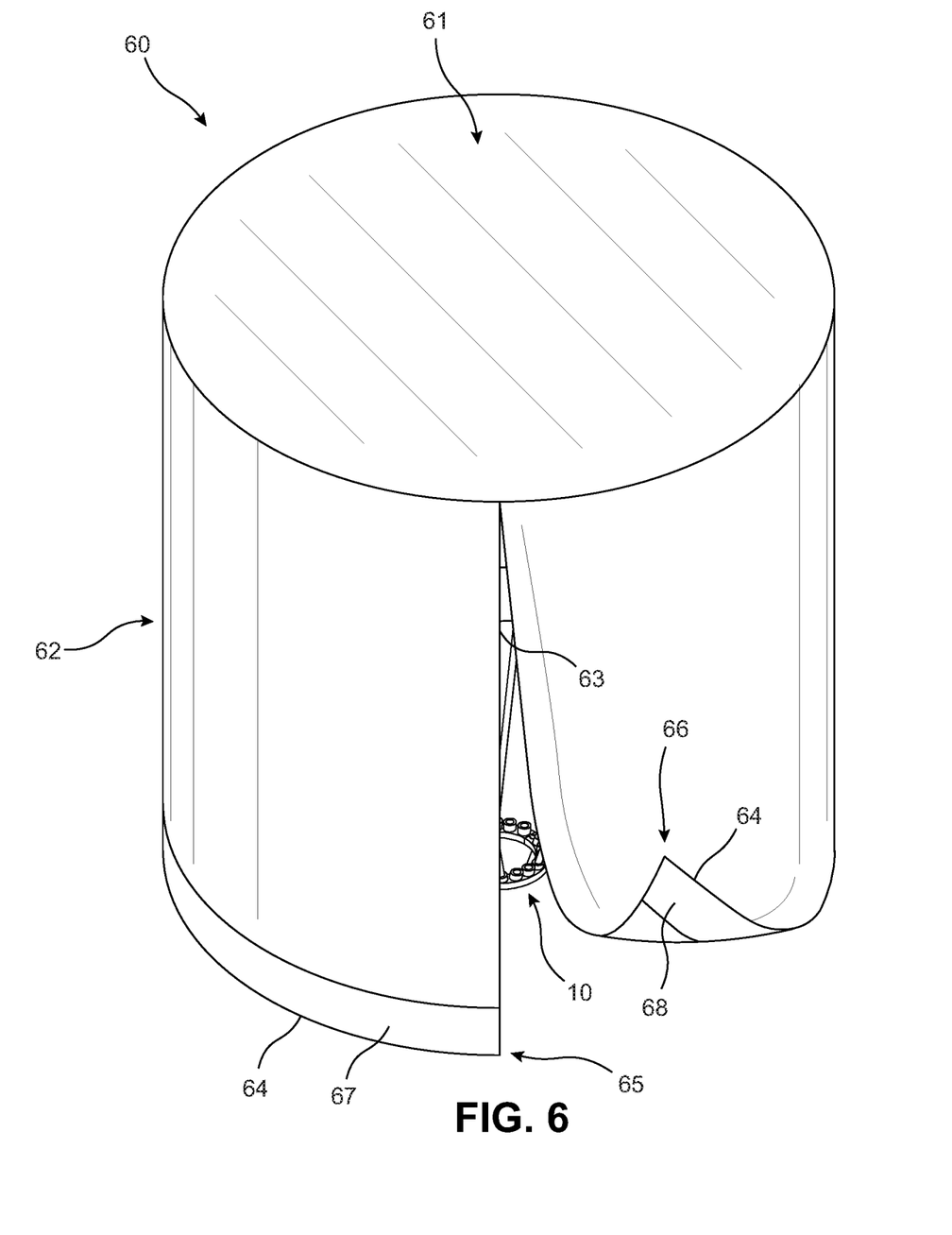
FIG. 6 is a front perspective view of the plant cage of FIG. 1 when initially covered by a protective cover.
Figure 7:
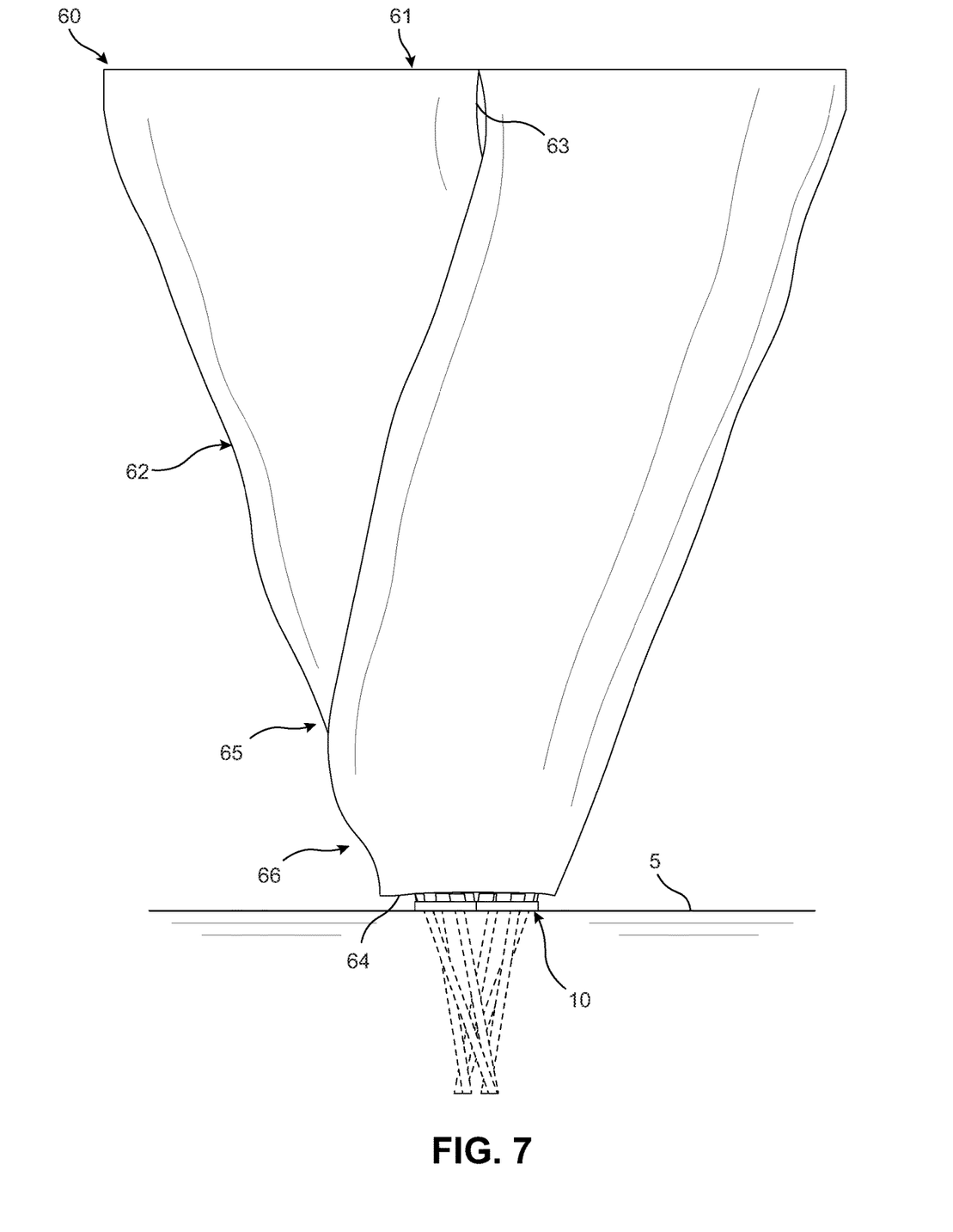
FIG. 7 is a front elevational view of the plant cage when the protective cover of FIG. 6 is cinched around the plant cage.

Referring now to FIGS. 6 and 7, the plant cage 10 may also be utilized with a protective cover 60 utilized as a tender plant protection tent or seasonal protection cover. The protective cover 60 includes a top 61 and a skirt 62 depending downwardly from the top 61. The top 61 may be circular and the skirt 62 may include a corresponding cylindrical configuration, as desired, but other shapes may be utilized without necessarily departing from the scope of the present invention, including a top 61 with a square or hexagonal shape and a skirt 62 with a corresponding number of sides depending from the perimeter of the top 61.

The skirt 62 includes a longitudinally extending slit 63 formed therein and extending from a peripheral edge of the top 61 to a rim 64 formed at the bottom of the skirt 62. The slit 63 divides the skirt 62 into a first flap 65 to a first side of the slit 63 and a second flap 66 to a second side of the slit 63. The flaps 65, 66 are configured to be coupled to each other using an attachment method such as the use of hook-and-loop fastening structures. The first flap 65 includes a first fastening strip 67 disposed on an outer surface of the skirt 62 adjacent the rim 64 thereof while the second flap 66 includes a second fastening strip 68 disposed on an inner surface of the skirt 62 adjacent the rim 64 thereof, wherein each of the strips 67, 68 extends longitudinally in the circumferential direction of the rim 64. The first fastening strip 67 may be formed from the hooks or loops of the hook-and-loop fastening structures while the second fastening strip 68 may be formed from the other of the hooks or loops of the hook-and-loop fastening structures.

As shown in FIG. 7, the protective cover 60 is tightened around the plant cage 10 by pulling the second flap 66 over the first flap 65 in the circumferential direction of the rim 64 to cinch the skirt 62 around the base 12. When a desired overlap between the flaps 65, 66 is achieved the cooperating first and second fastening strips 67, 68 are coupled to each other to establish the cinched position of the protective cover 60 adjacent the base 12. The protective cover 60 according takes on a substantially conical shape corresponding to that of the assembled configuration of the plant cage 10.

The plant cage 10 may be provided as part of a kit including each of the components associated with formation of the plant cage 10 into the assembled configuration thereof. The kit may include at least two of the segments 13, 14 for forming at least one of the bases 12 and a plurality of the stakes 50 for use in forming at least one of the plant cages 10. The kit may also optionally include a length of the wire 6 for supplementing each of the assembled plant cages 10 formed using the segments 13, 14 and the stakes 50. The kit may also include at least one of the protective covers 60 for covering the at least one plant cage 10. The kit may also optionally include an instruction set (not shown) discussing the possible configurations and method of using the aforementioned components. One possible kit may include two segments 13, 14 for forming one base 12, four or six of the stakes 50, a length of 6 feet of the wire 6, and an associated instruction set. However, it should be understood that the kit may include any combination of the disclosed components mentioned above so long as the kit includes at least the segments 13, 14 used to form one base 12 and at least two of the stakes 50. It should also be understood that any of the described components may be sold separately to supplement those components provided as a part of the associated kit.

From the foregoing description, one ordinarily skilled in the art can easily ascertain the essential characteristics of this invention and, without departing from the spirit and scope thereof, can make various changes and modifications to the invention to adapt it to various usages and conditions.

We claim:

1. A plant cage comprising: a base configured to surround a portion of a plant, the base including a plurality of circumferentially spaced stake openings formed therethrough, wherein the plurality of the stake openings includes a first set of the stake openings and a second set of the stake openings, wherein each of the stake openings belonging to the first set of the stake openings is inclined at a first angle relative to a central axis of the base and each of the stake openings belonging to the second set of the stake openings is inclined at a second angle relative to the central axis of the base, wherein the first angle is different from the second angle; and a plurality of stakes, each of the stakes extending rectilinearly from a first end to a second end, each of the stakes configured to extend through one of the stake openings formed through the base, a first portion of each of the stakes including the first end thereof received in the ground and a second portion of each of the stakes including the second end thereof extending away from the ground.

2. The plant cage of claim 1, wherein the base is annular in shape.

3. The plant cage of claim 1, wherein the base includes a first surface configured to rest on a surface of the ground and a second surface formed opposite the first surface.

4. The plant cage of claim 3, wherein a first portion of each of the stakes extends beyond the first surface and into the ground and a second portion of each of the stakes extends beyond the second surface and away from the ground.

5. The plant cage of claim 3, wherein each of the stake openings is inclined to extend radially outwardly relative to a central axis of the base as each of the stake openings extends through the base from the first surface to the second surface.

6. The plant cage of claim 5, wherein at least one of the stake openings is also inclined in a direction tangential to a perimeter of the base.

7. The plant cage of claim 3, wherein each of the stake openings extends through a guide projection projecting from the second surface of the base.

8. The plant cage of claim 1, wherein the base is annular in shape, and wherein the stake openings repeatedly alternate between one of the stake openings belonging to the first set and one of the stake openings belonging to the second set along a circumferential direction of the base.

9. The plant cage of claim 1, further comprising a length of wire configured to be wrapped around at least one of the stakes.

10. The plant cage of claim 1, further comprising a protective cover including a top and a skirt depending from the top, the skirt including a slit dividing the skirt into a first flap and a second flap.

11. A plant cage comprising: an annular base configured to surround a portion of a plant, the base including a plurality of circumferentially spaced stake openings formed therethrough, each of the stake openings inclined relative to a central axis of the base; and a plurality of rigid and elongate stakes, each of the stakes extending rectilinearly from a first end to a second end, each of the stakes configured to extend through one of the stake openings formed through the base, a first portion of each of the stakes including the first end thereof received in the ground and a second portion of each of the stakes including the second end thereof extending away from the ground, wherein each of the stakes is configured to extend through a corresponding one of the stake openings at the same angle of inclination relative to the central axis of the base as the corresponding one of the stake openings, wherein a first one of the stakes is received through a first one of the stake openings inclined at a first angle relative to a central axis of the base and a second one of the stakes is received through a second one of the stake openings inclined at a second angle relative to the central axis of the base, wherein the first angle is different from the second angle, wherein the first one of the stakes is inclined to extend at least partially in a first radial direction towards the central axis of the base as the first one of the stakes extends from the second end thereof towards the first end thereof, and wherein the second one of the stakes is inclined to extend at least partially in a second radial direction towards the central axis of the base as the second one of the stakes extends from the second end thereof towards the first end thereof, wherein the first radial direction is arranged opposite the second radial direction.

12. A method of assembling a plant cage comprising the steps of:
positioning an annular base above the ground with the base surrounding a portion of a plant, the base including a plurality of circumferentially spaced stake openings formed therethrough, each of the stake openings inclined relative to a central axis of the base; and
extending a plurality of rigid and elongate stakes through the stake openings of the base with each of the stakes extending rectilinearly from a first end to a second end, wherein a first portion of each of the stakes including the first end thereof is received in the ground and a second portion of each of the stakes including the second end thereof extends away from the ground when the stakes are extended through the stake openings, wherein a first one of the stakes is received through a first one of the stake openings inclined at a first angle relative to a central axis of the base and a second one of the stakes is received through a second one of the stake openings inclined at a second angle relative to the central axis of the base, wherein the first angle is different from the second angle, wherein the first one of the stakes is inclined to extend at least partially in a first radial direction towards the central axis of the base as the first one of the stakes extends from the second end thereof towards the first end thereof, and wherein the second one of the stakes is inclined to extend at least partially in a second radial direction towards the central axis of the base as the second one of the stakes extends from the second end thereof towards the first end thereof, wherein the first radial direction is arranged opposite the second radial direction.

\* \* \* \* \*